United States Patent
Wu et al.

(10) Patent No.: US 10,152,505 B2
(45) Date of Patent: Dec. 11, 2018

(54) DISTRIBUTED SYSTEMS AND METHODS FOR DATABASE MANAGEMENT AND MANAGEMENT SYSTEMS THEREOF

(71) Applicant: NATIONAL TSING HUA UNIVERSITY, Hsinchu (TW)

(72) Inventors: Shan-Hung Wu, Hsinchu (TW); Meng-Kai Liao, Hsinchu (TW); Shao-Kan Pi, Hsinchu (TW); Yu-Shan Lin, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 381 days.

(21) Appl. No.: 14/949,814

(22) Filed: Nov. 23, 2015

(65) Prior Publication Data

US 2017/0060935 A1    Mar. 2, 2017

(30) Foreign Application Priority Data

Aug. 25, 2015 (TW) .............................. 104127629 A

(51) Int. Cl.
G06F 17/30 (2006.01)

(52) U.S. Cl.
CPC .. *G06F 17/30371* (2013.01); *G06F 17/30463* (2013.01); *G06F 17/30486* (2013.01); *G06F 17/30958* (2013.01)

(58) Field of Classification Search
CPC ..................... G06F 17/30368; G06F 17/30371
USPC .................................................. 707/703, 626
See application file for complete search history.

(56) References Cited

U.S. PATENT DOCUMENTS

| | | | |
|---|---|---|---|
| 8,977,898 B1 * | 3/2015 | Veeraswamy | G06F 17/30227 714/15 |
| 2004/0133714 A1 | 7/2004 | Haren | |
| 2008/0049022 A1 * | 2/2008 | Sherb | G06F 9/5038 345/440 |
| 2015/0269215 A1 * | 9/2015 | Lehouillier | G06F 17/30368 707/626 |

FOREIGN PATENT DOCUMENTS

| | | |
|---|---|---|
| TW | 200820023 | 5/2008 |
| TW | 201120663 A1 | 6/2011 |

* cited by examiner

*Primary Examiner* — Chelcie L Daye

(57) ABSTRACT

Methods for database management in a distributed system are provided, wherein the distributed system at least includes a plurality of servers. The method includes the steps of: collecting transactions to be executed, wherein each transaction corresponds to a plurality of requests and each request is associated with at least one data; generating a transaction dependency graph corresponding to the requests according to data dependency among the data associated with the requests of all the transactions; partitioning the transaction dependency graph to generate a plurality of partitions corresponding to the servers; generating execution plans corresponding to the partitions; distributing the transactions to the servers for execution based on the generated execution plans.

15 Claims, 10 Drawing Sheets

DISTRIBUTED SYSTEMS AND METHODS FOR DATABASE MANAGEMENT AND MANAGEMENT SYSTEMS THEREOF

CROSS REFERENCE TO RELATED APPLICATIONS

This application claims the benefit of Taiwan Patent Application No. 104127629, filed Aug. 25, 2015, the entirety of which is incorporated by reference herein.

BACKGROUND OF THE INVENTION

Field of the Invention

The disclosure relates generally to management systems and methods and, more particularly to distributed systems and methods for database management and management systems thereof.

Description of the Related Art

In recent years, with the development of technology and the Internet, there have been larger amount of computing that need to be processed, such as scientific computing, cloud services, and so on. This large-scale computing requires a large distributed management system for support. Due to increased network bandwidth, the geographical restrictions are broken such that different distributed systems from everywhere can be integrated. However, with the technological advanced, hardware purchased in different times will vary significantly, widening differences among the hardware equipment resources in the distributed systems and making computing resource management for the distributed system become complex. In addition, as the distributed system is no longer subject to geographical limitations, the network and performance have a more significant impact on the system, thus leading to increased resource variability and more difficulty involved in grasping the system machine status.

Currently, the data in the database of the distributed system is mostly stored in a hard disk. Due to the characteristics of the distributed system, data partition for storage in different locations is often needed. For databases managed by large systems, such as Google™, Yahoo™, and other portals, there is a large amount of data that need to be partitioned for storage in different hard disks at different servers. When specific data is needed, it has to be accessed from the hard disk of different servers, resulting in difficult data access.

In addition, current distributed system database management techniques, such as the dynamic data partition technique, mainly studies how research data can be moved among different hard disks. The database partition method is used to manage data in different database servers, which will result in inability to increase execution through a need to continuously re-partition data, leading to poor execution performance.

BRIEF SUMMARY OF THE INVENTION

Distributed systems and related methods for database management and management systems thereof are provided.

In one embodiment, a method for database management in a distributed system is provided, wherein the distributed system at least comprises a plurality of servers, the method comprising the steps of: collecting transactions to be executed, wherein each transaction corresponds to a plurality of requests and each request is associated with at least one data; generating a transaction dependency graph corresponding to the requests according to data dependency among the data associated with the requests of all the transactions; partitioning the transaction dependency graph to generate a plurality of partitions corresponding to the servers according to a partition rule; generating execution plans corresponding to the partitions; and distributing the transactions to the servers for execution based on the generated execution plans.

Another embodiment of the invention provides a distributed system, comprising a plurality of servers and a management system which is configured on at least one of the servers for managing the servers. The management system is configured to collect transactions to be executed, wherein each transaction corresponds to a plurality of requests and each request is associated with at least one data, generate a transaction dependency graph corresponding to the requests according to data dependency among the data associated with the requests of all the transactions, partition the transaction dependency graph to generate a plurality of partitions corresponding to the servers according to a partition rule, generate execution plans corresponding to the partitions and distribute the transactions to the servers for execution based on the generated execution plans.

Yet another embodiment of the invention provides a management system for use in a sever of a distributed system. The management system comprises a communication device and a processor. The communication device is configured to communicate with one or more of other servers within the distributed system. The processor is coupled to the communication device for collecting a plurality of transactions to be executed by communicating with other servers using a group communication, wherein each transaction corresponds to a plurality of requests and each request is associated with at least one data, generating a transaction dependency graph corresponding to the requests according to data dependency among the data associated with the requests of all the transactions, partitioning the transaction dependency graph to generate a plurality of partitions corresponding to the servers according to a partition rule, generating execution plans corresponding to the partitions, and distributing the transactions to the servers for execution based on the generated execution plans.

Methods for database management in a distributed system may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Embodiments of the invention provide database management methods suitable for use in the distributed system, which can manage data among different database servers. Instead of data partitioning of the database, transaction partitioning is adopted, taking into account the system performance and the current status of the servers. In addition to distributing data in different hard disks at different nodes (such as servers), data is also distributed in the memory at different nodes and the memory configuration is managed to generate related distribution diagrams and transaction-based dependency graphs. Additionally, partitioning is done based on the existing conditions. Through the "push" mechanism, data execution on the same server can be done as possible in order to push the data in a data partitioned state to the server for transaction execution. Therefore, the execution time of distributed transaction can be greatly reduced, without require continuous re-partition of data, thereby preventing having to move large quantities of data.

Figure 1:
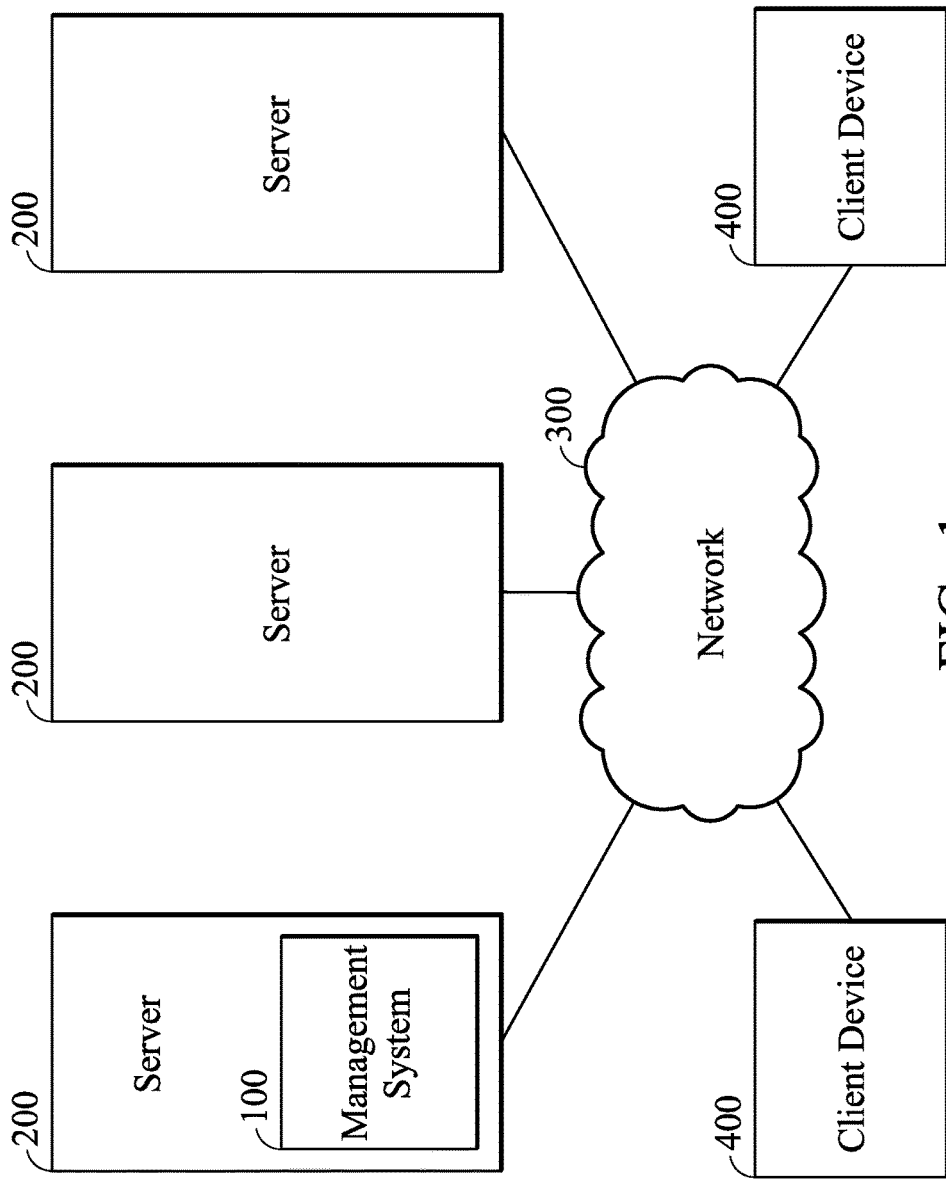
FIG. 1 is a schematic diagram illustrating an embodiment of a distributed system of the invention.

FIG. 1 is a schematic diagram illustrating an embodiment of a distributed system 10 of the invention. For example, the distributed system 10 can be a cloud computing system, but the invention is not limited thereto. The distributed system 10 includes at least a plurality of servers 200 or host devices, these servers 200 may be coupled to and communicated with each other via a connected network 300 such as the INTERNET, any wireless network and so on. The server 200 may further comprise a management system 100, which can be used to manage the servers and receive various job requests from various client devices 400 (such as PCs (personal computers), PDAs (Personal Digital Assistant), smartphones, mobile phones, MIDs (Mobile Internet Device), laptop computers or any other type of mobile computational devices, however it is to be understood that the invention is not limited thereto) through the connected network 300 to perform the method for database management in a distributed system of the present invention, which will be discussed further in the following paragraphs.

Figure 9:
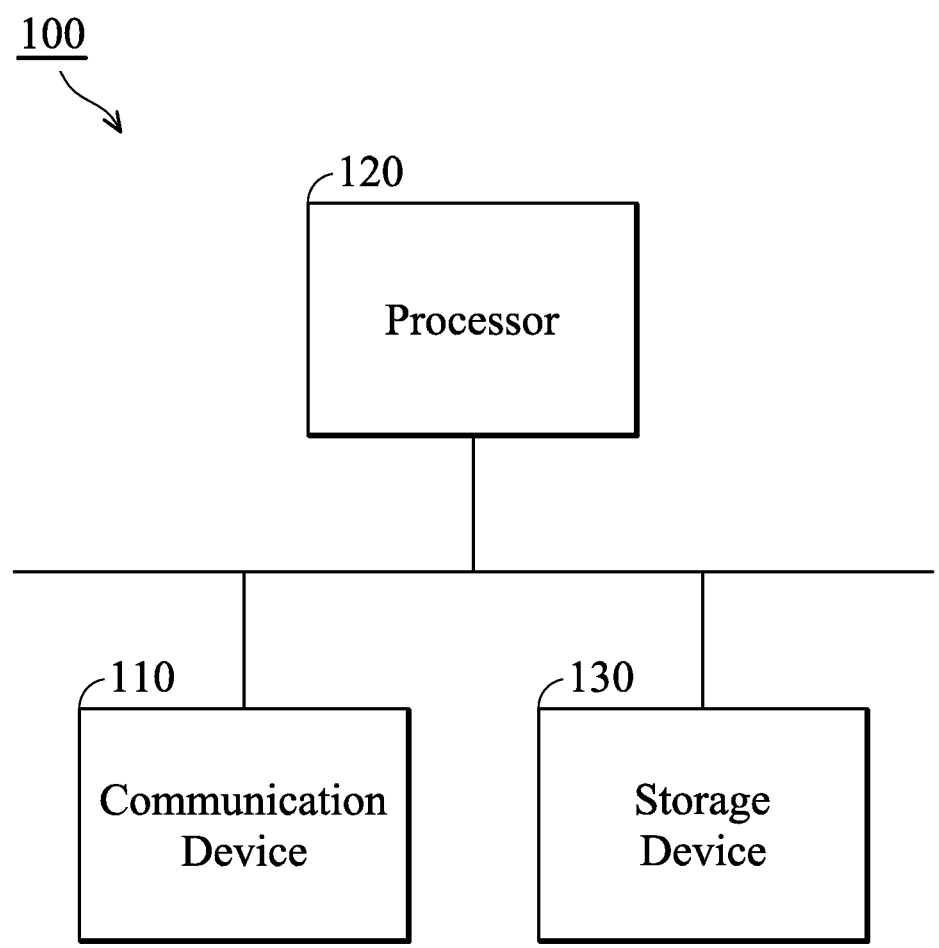
FIG. 9 is a schematic diagram illustrating an embodiment of a management system of the invention.

FIG. 9 is a schematic diagram illustrating an embodiment of a management system 100 of the invention. The management system 100 can be applied to any types of servers 200, such as PCs, PDAs, smartphones, mobile phones, MIDs, laptop computers, or any other type of mobile computational devices. However, it is to be understood that the invention is not limited thereto. It to be understood that, the management system is configured on one of the servers in FIG. 1 to facilitate the explanation, but the invention is not limited thereto. In some embodiments, the management system 100 may be provided to each server 200 in the distributed system 10 to separately perform the method for database management in the distributed system of the invention.

The management system 100 at least comprises a communication device 110, a processor 120 and a storage device 130. To be more specific, the management system 100 can include suitable software, hardware circuitry and devices for controlling the communication device 110, the processor 120 and the storage device 130 to perform the method for database management in the distributed system of the invention.

The communication device 110 is responsible for providing the function of wired or wireless network access, so that the servers 200 may connect to the Internet or a particular server set up on the Internet via the connected network 300. The wired network access may include an Ethernet connection, an Asymmetric Digital Subscriber Line (ADSL), a cable connection, or the like. The wireless network access may include a connection to a Wireless Local Area Network (WLAN), a WCDMA system, a Code Partition Multiple Access 2000 (CDMA-2000) net system work, a Time Partition-Synchronous Code Partition Multiple Access (TD-SCDMA) system, a Worldwide Interoperability for Microwave Access (WiMAX) system, a Long Term Evolution (LTE) system, an LTE Advanced (LTE-A) system, or a Time-Partition LTE (TD-LTE) system. When the communication device 110 is a wireless communication transceiver, it may further comprise a Radio Frequency (RF) unit and a Baseband unit. Specifically, the Baseband unit may contain multiple hardware devices to perform baseband signal processing, including ADC/DAC, gain adjusting, modulation/demodulation, encoding/decoding, and so on, while the RF unit may receive RF wireless signals, convert the received RF wireless signals to baseband signals, which are processed by the Baseband unit, or receive baseband signals from baseband unit and convert the received baseband signals to RF wireless signals, which are transmitted later. The RF unit may also contain multiple hardware devices to perform radio frequency conversion, such as a mixer for multiplying the baseband signals with a carrier oscillated in the radio frequency of the wireless communications system, wherein the radio frequency may be 2.4 GHz or 5 GHz utilized in the Wireless-Fidelity (WiFi) technology, or may be 2.402~2.480 GHz utilized in the Bluetooth technology, or others depending on the wireless technology in use. To be more specific, the management system 100 may receive transaction requests from the client devices and perform a group communication with other servers 200 via the communication device 110 for collecting multiple transactions to be executed to perform the method for database management in the distributed system of the invention.

The processor 120 may be a Central Processing Unit (CPU), Micro-Control Unit (MCU), Digital Signal Processor (DSP), or the like, which provides the function of data processing and computing. More particularly, the processor 120 may load and execute a series of instructions and/or program codes from the storage device 130 to control the operation of the communication device 110 and the processor 120, and receive transaction-related information from the servers 200, for performing the method for database management in the distributed system of the invention.

The storage device 130 may be a non-volatile storage medium (e.g., Read-Only Memory (ROM), Flash memory, magnetic tape, hard disk, or optical disc), or a volatile storage medium (e.g., Random Access Memory (RAM)), or any combination thereof for storing data, such as instructions, program codes, and input data from users.

Although they are not shown, the management system 100 may further comprise other functional units, such as an Input/Output (I/O) device, e.g., button, keyboard, or mouse, etc., and the invention is not limited thereto.

In some embodiments, the management system 100 may be configured on a computer system external to the distributed system 10 and it can communication with all of the servers 200 in the distributed system 10 to obtain enough data for performing the method for database management in the distributed system of the invention.

Figure 2:
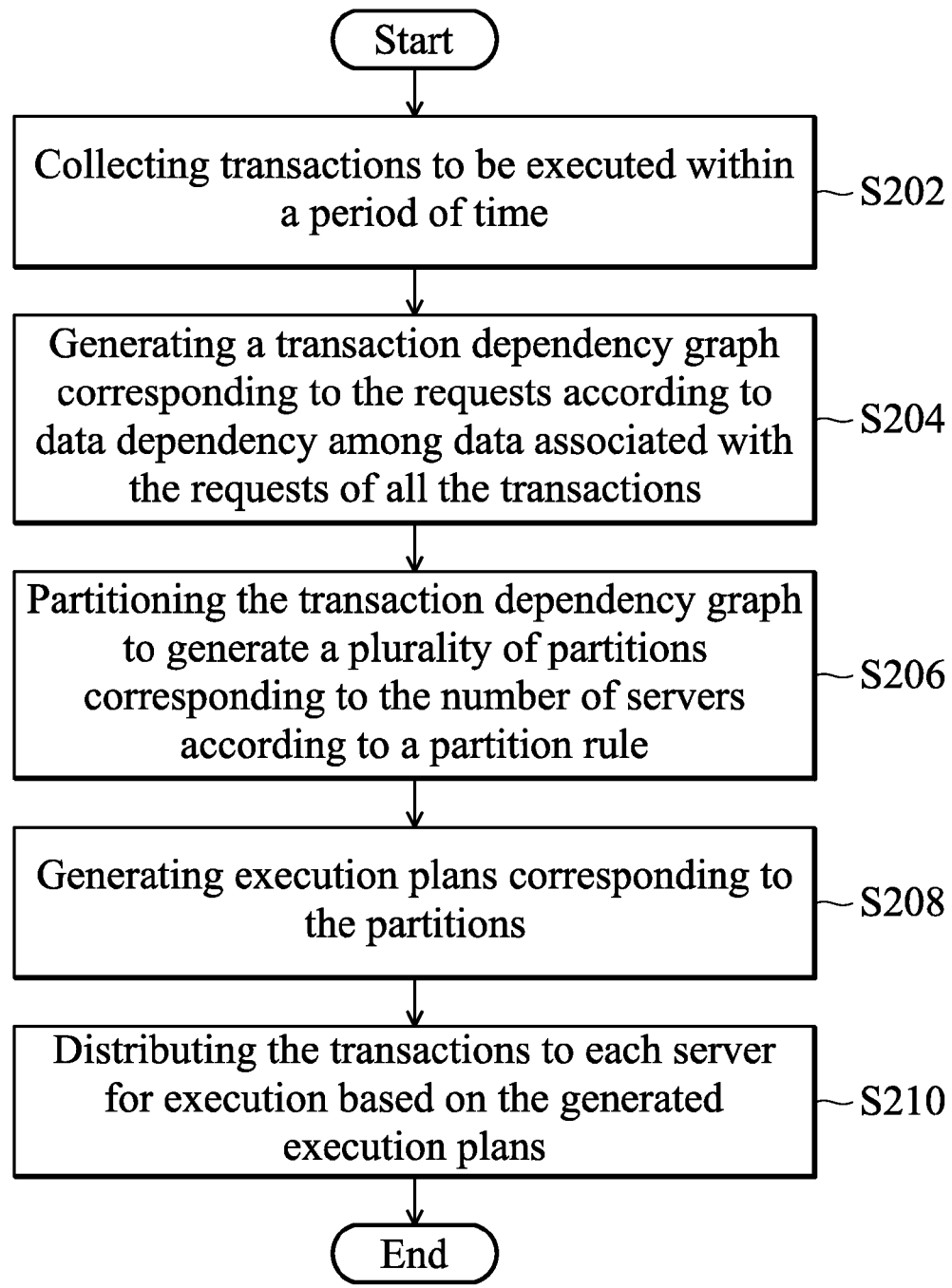
FIG. 2 is a flowchart of an embodiment of a method for database management of the distributed system of the invention.

FIG. 2 is a flowchart of an embodiment of a method for database management in the distributed system of the invention. The method for database management in the distributed system can be applied to a distributed system, such as the distributed system 10 as shown in FIG. 1 and can be performed by processor 110 of the management system 100 of the server 200. In this embodiment, the distributed system 10 may at least include a plurality of servers 200, wherein each server 200 may include a management system 100, which can be used to manage its correspondence server 200, such as arranging the transaction to be executed and the order for execution for each server 200 and so on. In some embodiments, the management system 100 may be configured on one of the server 200 in the distributed system 10. In other embodiments, the management system 100 may be configured on each server 200 within the distributed system 10.

First, in step S202, the management system 100 collects the transactions to be executed within a period of time, wherein each transaction corresponds to multiple requests and each request is associated with one or more data. In this embodiment, it is assumed that the distributed system 10 is a system that data required for all transactions can be known in advance, so that this system can know in advance what information is requested by each transaction separately and thus knows which data are associated with each request. For example, the distributed system 10 can be a deterministic distributed database system, but it is not limited thereto.

Figure 3A:
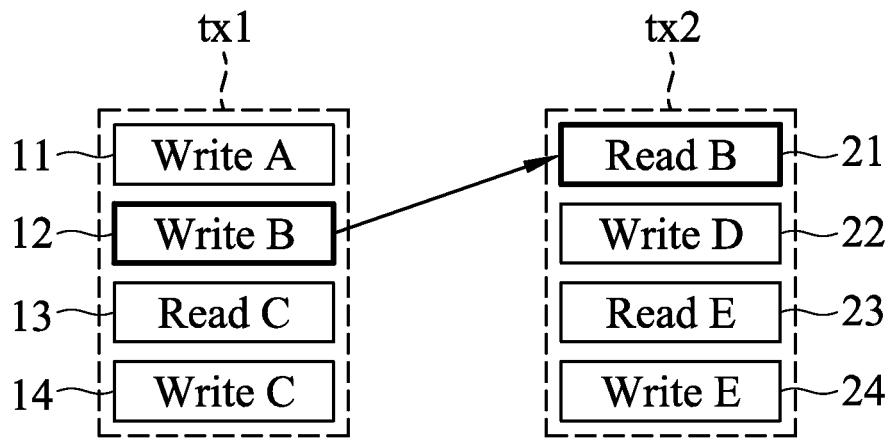
FIG. 3A is a schematic diagram illustrating an embodiment of transactions of the invention.

Referring to FIG. 3A, which is a schematic diagram illustrating an embodiment of transactions of the invention. As shown in FIG. 3A, there are two transactions tx1 and tx2 in which the transaction tx1 includes requests 11, 12, 13 and 14 and the transaction tx2 includes requests 21, 22, 23 and 24. As shown, the request 12 in the transaction tx1 includes an instruction to write a data B, and therefore the request 12 is associated with the data B. Similarly, the request 21 in the transaction tx2 includes an instruction to read the data B, and therefore the request 21 is also associated with the data B.

Subsequently, in step S204, the management system 100 generates a transaction dependency graph corresponding to the requests according to data dependency among data associated with the requests of all the transactions. Specifically, in the embodiments of the invention, the transaction itself can be treated as a node in the transaction dependency graph and data associated with each transaction and the data dependencies between the transactions are applied to establish the transaction dependency graph. As aforementioned, in some embodiments, the management system 100 can be set on each server 200 of the distributed system 10. In such embodiments, the management system 100 on respective server 200 undergoes group communication to ensure all of the servers 200 receive transaction requires from the client end in the same sequence. On the other hand, the management system 100 on each server 200 can each calculate their own transaction dependency diagram and generate execution plans accordingly. In this example, since every server received the same transaction request, the execution plan generated was completely identical, which will lessen the burden of having to send the execution plan through the network. In addition, through group communication, the management system 100 can also receive various necessary data such as data related to the partition rules.

Figure 3B:
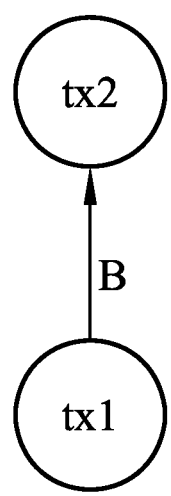
FIG. 3B is a schematic diagram illustrating an embodiment of data dependency of the invention.
Figure 3C:
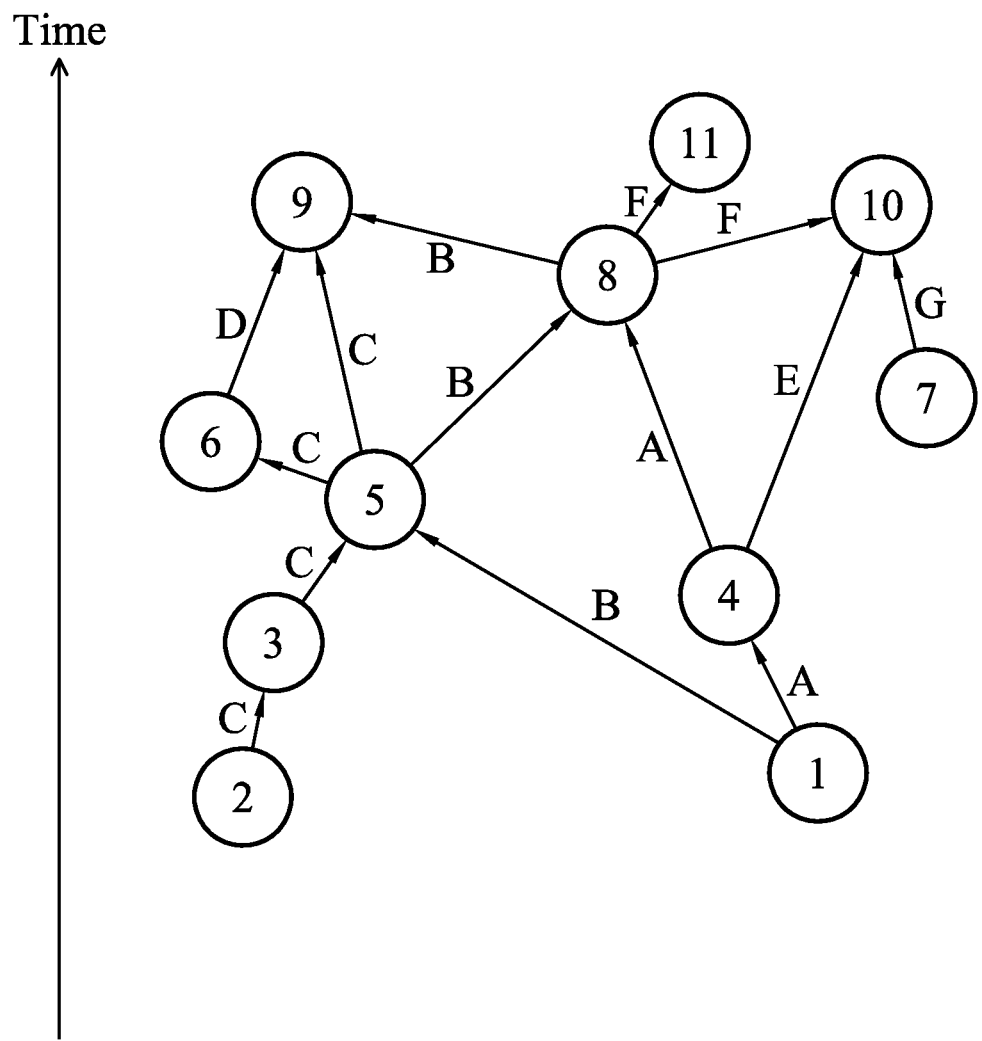
FIG. 3C is a schematic diagram illustrating an embodiment of a transaction dependency graph of the invention.

In some embodiments, in accordance with the data dependency between transactions to generate the transaction dependency diagram may further comprise generating the transaction dependency diagram based on data reading/writing requirements between data associated with the requests. Taking the transactions tx1 and tx2 as shown in FIG. 3A as an example, as both the request 12 in the transaction tx1 and the request 21 in the transaction tx2 were related to the data B and there is a relationship between reading and writing, data dependency between the two transactions can be generated based on the data B, as shown in FIG. 3B. Then, by way of the method shown in FIG. 3B, each transaction itself is treated as one node and based on the data dependency between the transactions, a complete transaction dependency diagram can be thus generated. FIG. 3C is a schematic diagram illustrating an embodiment of a transaction dependency graph of the invention. In this embodiment, as shown in FIG. 3C, it is assumed that a total of eleven transactions, numbered 1 to 11 respectively, will be executed within a preset time and the data associated therewith are A to G, a transaction dependency graph 300 can thus be generated according to the data dependency between the transactions 1 to 11.

Because the transaction dependency diagram in the invention was generated by using the transaction to be executed within a certain period of time, which served as the nodes, compared to conventional methods where all transactions in the part are used for analysis, the number of nodes in the transaction dependency diagram can be greatly reduced, making the transaction dependency diagram more concise and effectively reducing the time needed to generate a transaction dependency diagram.

After generating the transaction dependency diagram, in step S206, the management system 100 partitions the transaction dependency graph to generate a plurality of partitions corresponding to the number of servers according to a partition rule. It should be noted that partitioning the transaction dependency graph to generate the partitions may be performed on a memory of the management system 100. It should be understood that, in the embodiments, transaction partitioning is adopted instead of partitioning data of the database and distributed database management between memory allocations and hard disks allocations are taken into account during data distribution, and thus continuous re-partition of data are not required, thereby preventing having to move large quantities of data.

In some embodiments, the partition rules may include performing the partitioning based on a total data amount of multiple requests from transactions collected and the number of servers and the step of partitioning the transaction dependency graph to generate the partitions corresponding to the servers according to the partition rule may comprise equally distributing the data amount for each partition in the transaction dependency diagram as possible during the partitioning. In other words, each partition in the transaction dependency diagram should have an approximate number of nodes during partitioning to generate the partitions.

Figure 4:
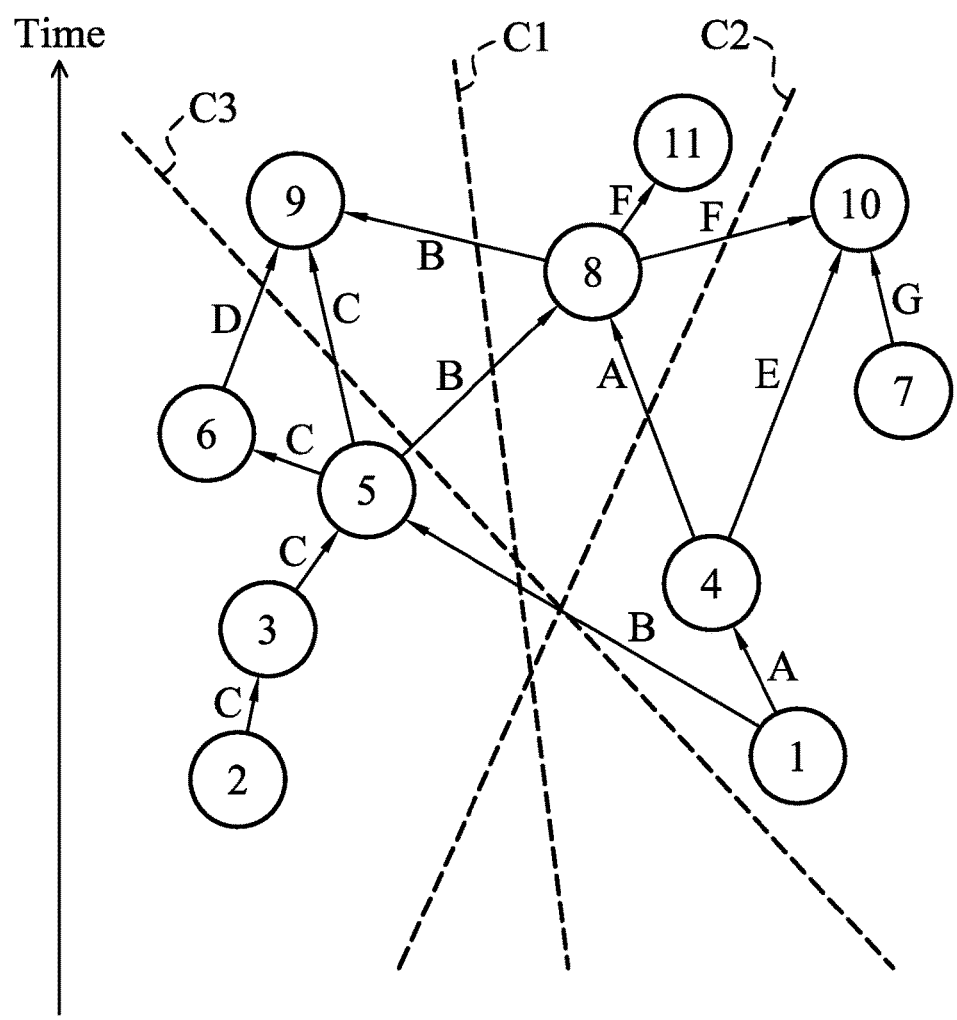
FIG. 4 is a schematic diagram illustrating an embodiment of partitioning the transaction dependency graph of the invention.

In some embodiments, the partition rule may further comprise performing the partitioning according to network access information of the requests, and the step of partitioning the transaction dependency graph to generate the partitions corresponding to the servers according to the partition rule is to minimize the network access for each partition in the transaction dependency diagram during the partitioning. FIG. 4 is a schematic diagram illustrating an embodiment of partitioning the transaction dependency graph of the invention. In this embodiment, it is assumed that there are two servers in the distributed system 10, and the transaction dependency graph 400 can be divided into two partitions, each of which corresponding to one of the two severs, wherein the partition rule is to equal the amount of data and to minimize the network access in each partition. As shown in FIG. 4, there are many possible ways of partitioning, as shown in the dotted line C1, C2 and C3. According to the above-mentioned partition rule, as the two partitions generated by the portioning as shown in the dotted line C1 conforms to the requirement that equals the amount of data and minimizes the network access in each partition information as compared with those generated related to the dotted lines C2 and C3, the partition manner shown by the dotted line C1 will be taken to generate a first partition and a second partition in the embodiment in which the first partition includes transaction 2, 3, 5, 6 and 9 and the second partition includes transaction 1, 4, 7, 8, 10 and 11.

In some embodiments, the partition rule may include performing the partitioning based on hard disk access information of the multiple requests. Additionally, the transaction dependency diagram is partitioned to generate partitions that have the least hard disk access for every partition in the transaction dependency diagram during partitioning.

In some embodiment, each server may include system performance and the portioning rule can include performing the portioning based on the respective system performance information of each server. In one embodiment, the system performance information can include processor performance information, such as processor type and processing speed, as well as usable storage space information such as usable memory and remaining hard disk space. In particular, the partition rule can include performing the partitioning based on the processor performance information of each server and/or usable storage space information of which. For example, if the system performance ratio of two servers is about 3:1, the management system 100 can generate the partitions for the two servers according to this given ratio.

In some embodiments, the system performance information may at least include workload-amount information. In addition, the respective partitions can be generated dynamically in response to the workloads of all the servers, Through the current workload of the servers, the quantity of transactions for the corresponding partitions can be either increased or decreased to achieve better execution efficiency.

It should be noted that, the management system 100 can obtain various data defined in the above-mentioned partition rules to generate the respective partitions.

After generating the respective partitions, in step S208, the management system 100 generates execution plans corresponding to the partitions and then, in step S210, distributes the transactions to each server 200 for execution based on the generated execution plans. In this way, each server may know which transactions should be executed and also know the execution order of those transactions according to the execution plan distributed thereto so as to sequentially execute the transactions by the execution order based on the respective execution plan.

Figure 5:
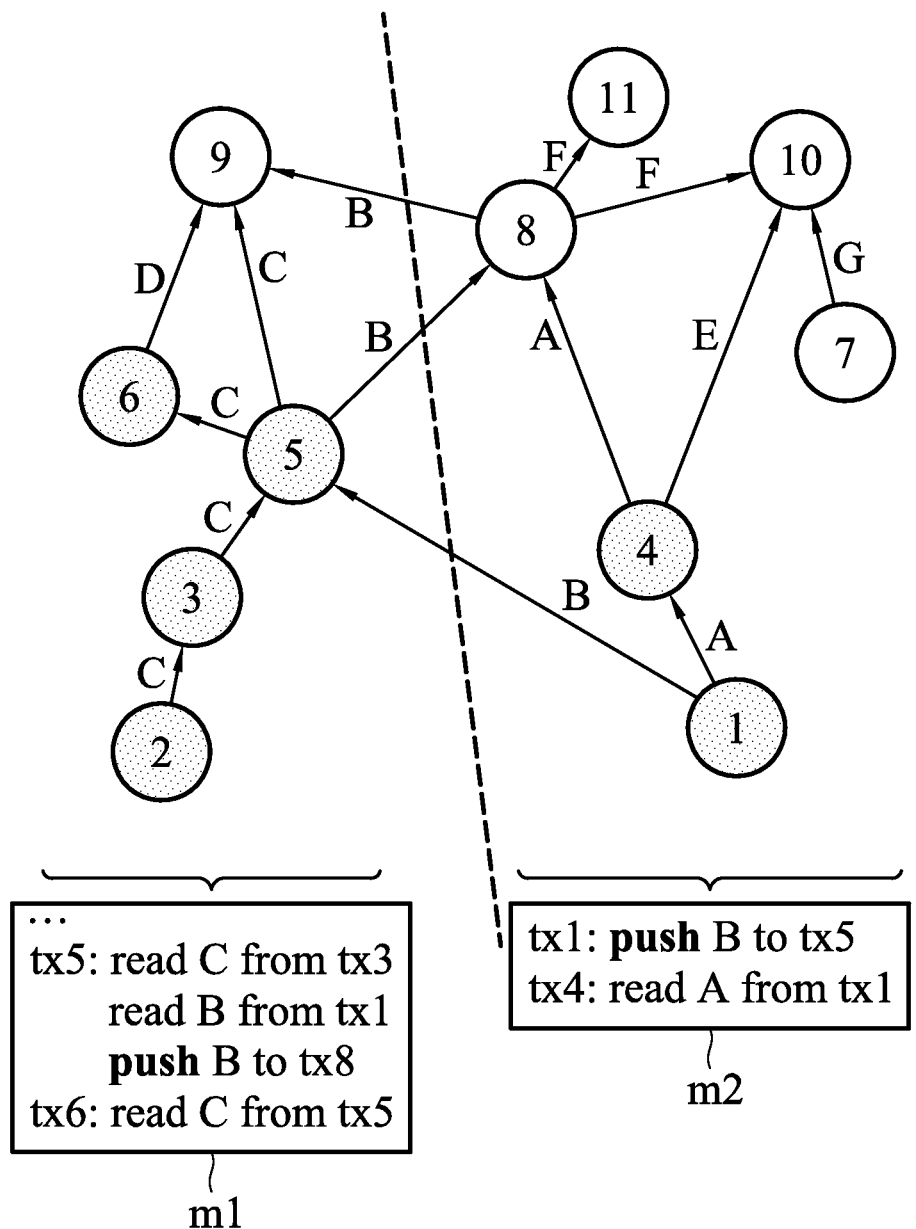
FIG. 5 is a schematic diagram illustrating an embodiment of execution plans of the invention.

In some embodiments, it is assumed that the aforementioned partitions include at least a first partition and a second partition, and the present invention can further, through the push mechanism, push first data associated with a first request in the first partition to the second partition before the execution of a second request that is associated with the first data in the second partition. For example, please refer to FIG. 5. FIG. 5 is a schematic diagram illustrating an embodiment of execution plans of the invention. Please refer together with FIGS. 4 and 5. As shown in FIG. 5, the management system 100 can generate two partitions corresponding to the two execution plans, namely, m1 and m2, based on the partition method shown in the dotted lines C1 of FIG. 4. They are then distributed to the first server and the second server for execution, respectively. Specifically, in the execution plan m1, a transaction tx5 needs to read data C from a transaction tx3 and data B from a transaction tx1. Hence, a push command can be increased. Through the push command such as a "push B to tx5" command, data B needed by the transaction tx5 is automatically pushed from the second server to the first server during the execution of transaction tx1 in the second server. The first server can first store the data B in its memory or hard disk. Then, when the first server executes the transaction tx5, data B stored can be directly used, without having to access it through the network, thus reducing the frequency of network access. Similarly, in the execution plan m2, a transaction tx8 needs to read data B from the transaction tx5 and a push command "push B to tx8" can be increased. Through the push command "push B to tx8", data B needed by the transaction tx8 is automatically pushed from the first server to the second server during the execution of transaction tx5 in the first server. The second server can store the data B in its memory or hard disk. Then, when the second server executes the transaction tx8, data B stored can be directly used, thus reducing the frequency of network access. Therefore, according to the embodiments of the invention, the management system 100 can predict which server and on which node data should be sent based on the execution plan. By doing so, before the machine in charge of the main execution needs data, the other machines can push the data over, thereby reducing the frequency of network access and substantially decreasing data processing time.

Figure 6:
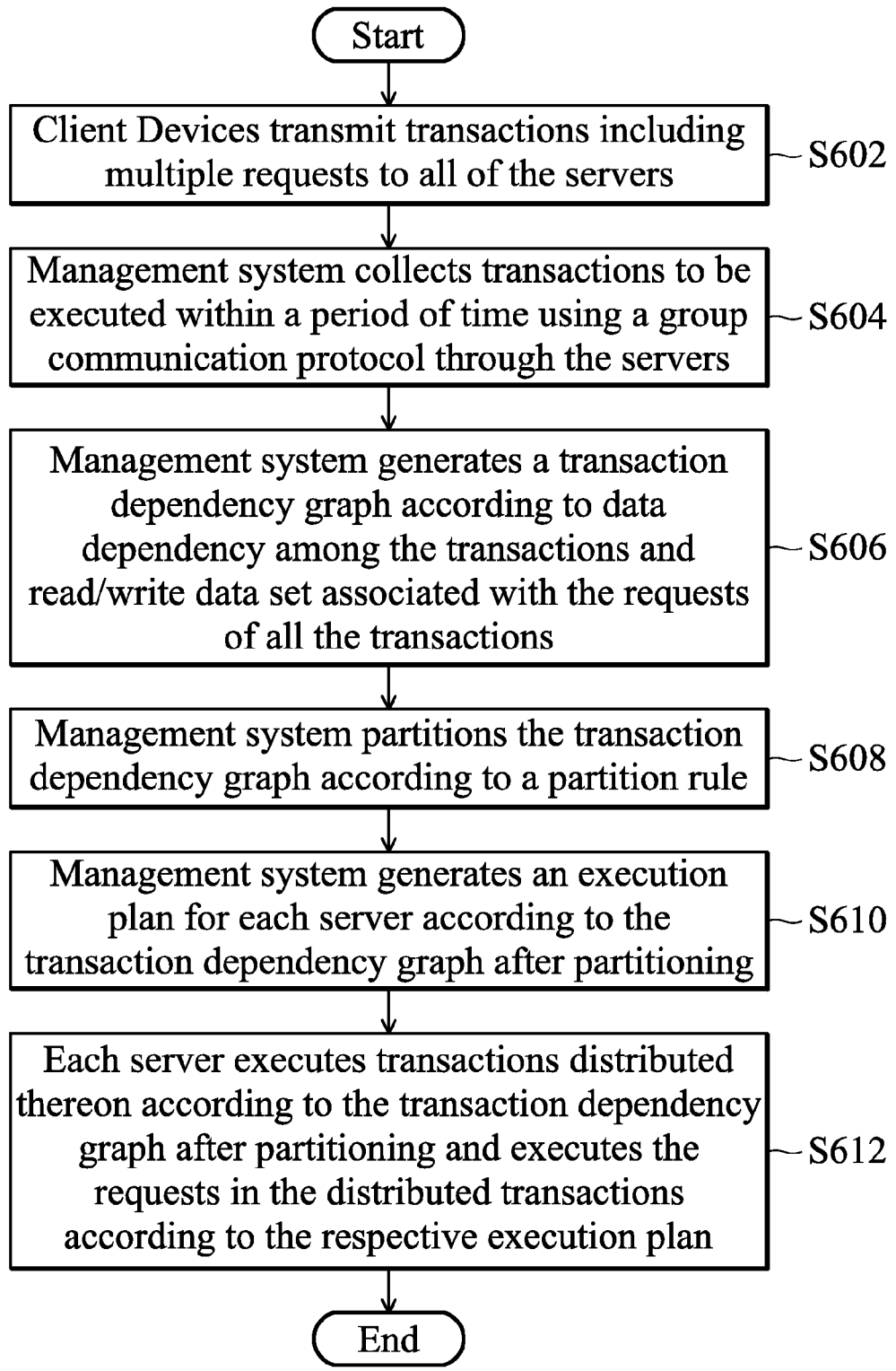
FIG. 6 is a flowchart of another embodiment of a method for database management of the distributed system of the invention.

FIG. 6 is a flowchart of another embodiment of a method for database management of the distributed system of the invention. The method for database management in the distributed system can be applied to a distributed system, such as the distributed system 10 as shown in FIG. 1.

First, the client devices 400 transmit transactions including multiple requests to all of the servers 200 (step S602). Thereafter, the management system 100 collects transactions to be executed within a period of time using a group communication protocol through the servers (step S604). As aforementioned, in some embodiments, the management system 100 can be set on each server 200 of the distributed system 10. In such embodiments, the management system 100 on respective server 200 undergoes group communication to ensure all of the servers 200 receive transaction requires from the client devices 400 in the same sequence. On the other hand, the management system 100 on each server 200 can each calculate their own transaction dependency diagram and generate execution plans accordingly.

Next, the management system 100 generates a transaction dependency graph according to data dependency among the transactions and read/write data set associated with the requests of all the transactions (step S606). Then, the management system 100 partitions the transaction dependency graph according to a partition rule (step S608). Among them, the partition rules may include a rule for minimizing the cross-partition edges within the transaction dependency graph. Partition rules may also include a rule for maximizing the number of nodes in each partition within the transaction dependency graph. Other partition rules are rules mentioned above and thus are omitted here for brevity.

After partitioning the transaction dependency graph based on the partition rule, the management system 100 generates an execution plan for each server 200 according to the transaction dependency graph after partitioning (step S610), wherein the management system 100 can predict which server 200 data should be sent based on the execution plan of each server 200. By doing so, before the server in charge of the main execution needs data, the other server can push the data over.

Next, each server executes transactions distributed thereon according to the transaction dependency graph after partitioning and executes the requests in the distributed transactions according to the respective execution plan (step S612).

In some embodiments, the method for database management of the distributed system of the invention may be further applied in the cloud database. According to the workload, partition can be adjusted to automatically adapt to dynamic workload changes, without having to continuously and dynamically change data partition.

Figure 7:
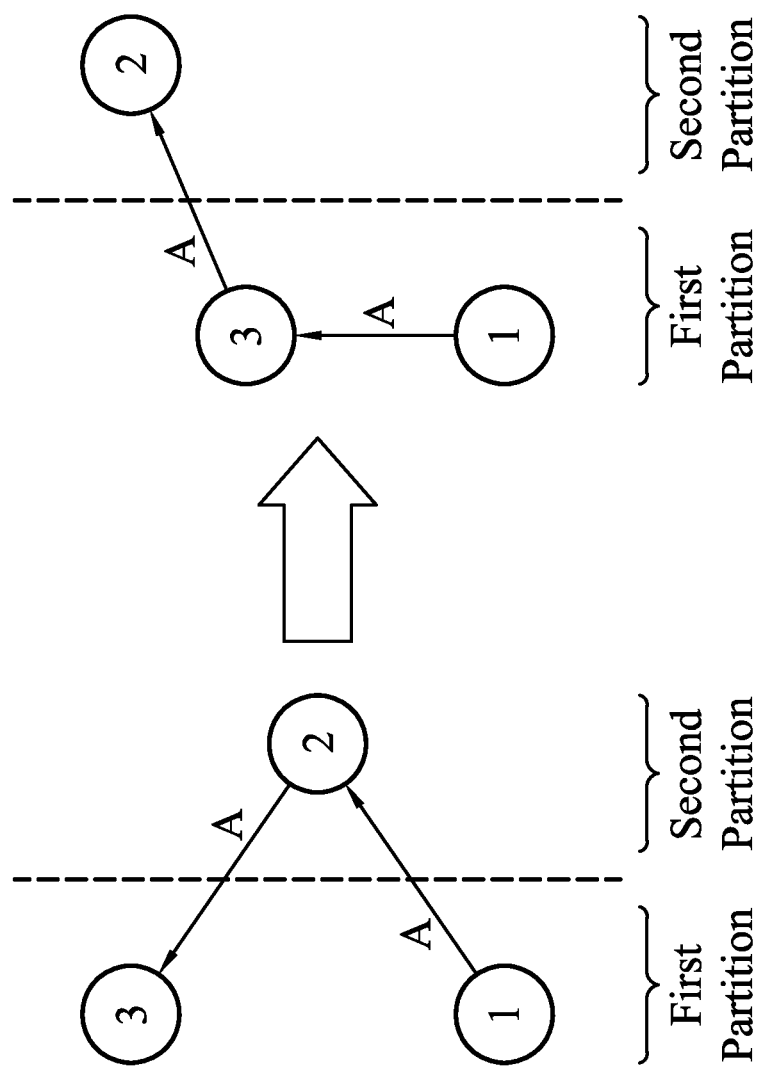
FIG. 7 is a schematic diagram illustrating another embodiment of partitions optimization of the invention.

According to some embodiments of the invention, the partitions generated may further be optimized in order to reduce the frequency of data access among the partitions. In one embodiment, the reduction of the frequency of data access among the partitions can be achieved by reordering the execution plan for a part of the transactions to be executed. In this embodiment, it is assumed that the transactions include at least a first transaction, a second transaction, and a third transaction and the partitions include at least a first partition and a second partition. In particular, the first, second, and third transaction distributed between the first and second partitions are executed in an execution order, and the management system 100 may reorder the execution order of the first, second and third transactions in order to reduce the frequency of data access between the first and second partitions. Please refer to FIG. 7. FIG. 7 is a schematic diagram illustrating another embodiment of partitions optimization of the invention. As shown in FIG. 7, the first partition includes a transaction 1 and a transaction 3, the second partition includes a transaction 2 and the execution order for these transactions is transaction 1, transaction 2, and then transaction 3. Under this configuration, data access needs to be performed twice between the two partitions. By reordering the execution order of the transactions 1-3, such that the execution order is changed from transaction 1, transaction 2, and transaction 3 to transaction 1, transaction 3, and transaction 2, requiring data access only once between the two partitions and thus reducing the frequency of data access between the partitions.

Figure 8:
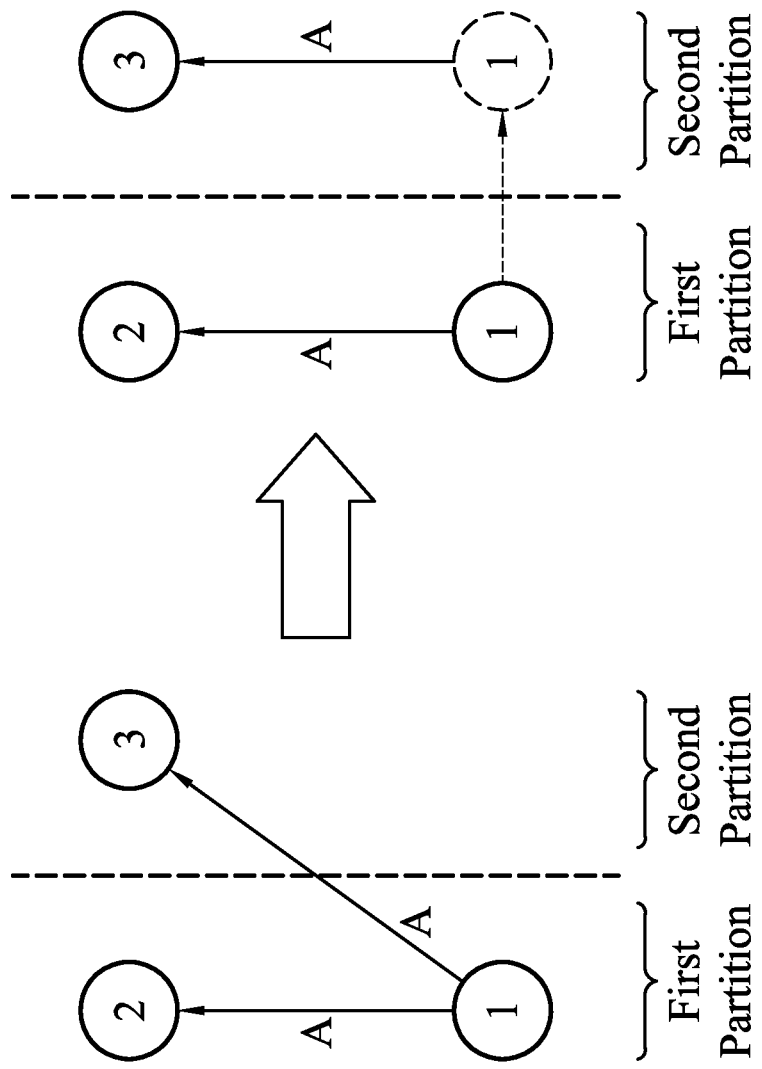
FIG. 8 is a schematic diagram illustrating an embodiment of execution plans of the invention.

In another embodiment, the reduction of the frequency of data access among the partitions can be achieved through replication of a part of the transactions to be executed. In this embodiment, it is assumed that the transactions include at least a first transaction, a second transaction, and a third transaction and the partitions include at least a first partition and a second partition. In particular, the first, second and third transaction distributed between the first and second partitions are executed in an execution order. In this case, the management System 100 may replicate the first transaction in the first partition to the second partition in order to reduce the frequency of data access between the first partition and the second partition. Please refer to FIG. 8. FIG. 8 is a schematic diagram illustrating another embodiment of partitions optimization of the invention. As shown in FIG. 8, the first partition includes transaction 1 and transaction 2 and the second partition includes transaction 3, wherein the execution order for the transactions 1-3 is first execute the transaction 1 and then the transaction 1 sends data A to the transactions 2 and 3. Under this configuration, data access needs to be performed once between the two partitions. By replicating the transaction 1 to the second partition, the transaction 1 can be executed in the two partitions separately. In this case, data A generated by the transaction 1 and is needed by the transaction 3 can be directly obtained after executing the transaction 1, and no data access is needed between two partitions, thus reducing the frequency of data access between the partitions.

Thus, the distributed systems and related methods for database management thereof of the invention can perform data management in different database servers through partitioning the transactions, rather than through partitioning the database data, thus facilitating the databases' adaptation to changing workloads and achieving the purpose of a high execution throughout. Furthermore, according to the method for database management in the distributed system of the invention, data can be pushed to the server executing transactions in advance under the existing data partition status and, through the push mechanism that pushes data in advance, data can be executed on the same server, without having to continuously re-partition data. At the same time, data can arrive at the server executing transactions before the said transaction is executed, thereby saving time on the server having to wait for data and greatly reducing the execution time of disturbed transactions. Therefore, the need for moving large amounts of data can be effectively prevented so as to enhance the processing performance of the distributed database.

Methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for database management in a distributed system, wherein the distributed system at least comprises a plurality of servers, the method comprising:
    collecting transactions to be executed, wherein each transaction corresponds to a plurality of requests and each request is associated with at least one data;

generating a transaction dependency graph composed of nodes and links according to data dependency among the data associated with the requests of all the transactions, wherein each transaction corresponds to one of the nodes and each link corresponds to a relationship between two of the transactions related to the same data;

partitioning the transaction dependency graph to generate a plurality of partitions corresponding to the servers according to a partition rule;

generating execution plans corresponding to the partitions; and distributing the transactions to the servers for execution based on the generated execution plans, wherein the partitions include at least a first partition and a second partition, and first data associated with a first request in the first partition is pushed to the second partition before execution of a second request which is associated with the first data in the second partition.

2. The method of claim 1, wherein each of the execution plans is distributed to one of the servers and each of the servers sequentially executes transitions distributed thereto according to the respective execution plan.

3. The method of claim 1, wherein the partition rule further comprises performing the partitioning according to a total data amount of the requests and the number of servers and the step of partitioning the transaction dependency graph to generate the partitions corresponding to the servers according to the partition rule is to equally distribute the data amount for each partition in the transaction dependency diagram during the partitioning.

4. The method of claim 1, wherein the partition rule further comprises performing the partitioning according to network access information of the requests, and the step of partitioning the transaction dependency graph to generate the partitions corresponding to the servers according to the partition rule is to minimize the network access for each partition in the transaction dependency diagram during the partitioning.

5. The method of claim 1, wherein the partition rule further comprises performing the partitioning according to hard-disk access information of the requests, and the step of partitioning the transaction dependency graph to generate the partitions corresponding to the servers according to the partition rule is to minimize the hard-disk for each partition in the transaction dependency diagram during the partitioning.

6. The method of claim 1, wherein each of these servers includes system performance information and the partition rule further comprises performing the partitioning according to the system performance information of the servers.

7. The method of claim 6, wherein the system performance information further comprises processor-performance information and available storage-space information, and the partition rule further comprises performing the partitioning according to the processor-performance information and/or the available storage-space information of the servers.

8. The method of claim 6, where the system performance information at least comprises workload-amount information, and the partitions are generated dynamically in response to the workload-amount information of the servers.

9. The method of claim 1, wherein the transactions include at least a first transaction, a second transaction and a third transaction and the partitions include at least a first partition and a second partition, and wherein the first, second and third transactions are distributed between the first and second partitions and are executed with an execution order, the method further comprising:

rescheduling the execution order among the first, second and third transactions in order to reduce a frequency for data accessing between the first and second partitions.

10. The method of claim 1, wherein the transactions include at least a first transaction, a second transaction and a third transaction and the partitions include at least a first partition and a second partition, and wherein the first, second and third transactions are distributed between the first and second partitions and are executed with an execution order, the method further comprising:

copying the first transaction in the first partition to the second partition in order to reduce a frequency for data accessing between the first and second partitions.

11. A distributed system comprising:

a plurality of servers; and a management system configured on at least one of the servers for managing the servers, wherein the management system is configured to collect transactions to be executed, wherein each transaction corresponds to a plurality of requests and each request is associated with at least one data, generate a transaction dependency graph composed of nodes and links according to data dependency among the data associated with the requests of all the transactions, wherein each transaction corresponds to one of the nodes and each link corresponds to a relationship between two of the transactions related to the same data, partition the transaction dependency graph to generate a plurality of partitions corresponding to the servers according to a partition rule, generate execution plans corresponding to the partitions and distribute the transactions to the servers for execution based on the generated execution plans, wherein the partitions include at least a first partition and a second partition, and first data associated with a first request in the first partition is pushed to the second partition before execution of a second request which is associated with the first data in the second partition.

12. The distributed system of claim 11, wherein each of the execution plans is distributed to one of the servers and each of the servers sequentially executes transitions distributed thereto according to the respective execution plan.

13. The distributed system of claim 11, wherein the partition rule further comprises performing the partitioning according to a total data amount of the requests and the number of servers and the management system is further configured to equally distribute the data amount for each partition in the transaction dependency diagram during the partitioning.

14. The distributed system of claim 11, wherein the partition rule further comprises performing the partitioning according to network access information of the requests, and the management system is further configured to minimize the network access for each partition in the transaction dependency diagram during the partitioning.

15. A management system for use in a server of a distributed system, comprising:

a communication device, communicating with one or more of other servers within the distributed system; and a processor coupled to the communication device, collecting a plurality of transactions to be executed by communicating with other servers using a group communication, wherein each transaction corresponds to a plurality of requests and each request is associated with at least one data, generating a transaction dependency graph composed of nodes and links according to data dependency among the data associated with the requests of all the transactions, wherein each transaction corresponds to one of the nodes and each link corresponds to a relationship between two of the transactions related to the same data, partitioning the transaction dependency graph to generate a plurality of partitions corresponding to the servers according to a partition rule, generating execution plans corresponding to the partitions, and distributing the transactions to the servers for execution based on the generated execution plans, wherein the partitions include at least a first partition and a second partition, and first data associated with a first request in the first partition is pushed to the second partition before execution of a second request which is associated with the first data in the second partition.

* * * * *